United States Patent [19]

Ives

[11] 4,071,389
[45] Jan. 31, 1978

[54] CYLINDER-MAKING APPARATUS AND METHOD

[76] Inventor: Frank Elmer Ives, 1862 Ives Ave., Kent, Wash. 98031

[21] Appl. No.: 653,435

[22] Filed: Jan. 29, 1976

[51] Int. Cl.² ............................................. B65H 8/00
[52] U.S. Cl. .................................. 156/175; 118/321; 156/425; 427/233
[58] Field of Search ............... 156/169, 171, 173, 175, 156/425, 428, 429–430, 446, 276; 118/321, 323; 427/233; 242/7.21, 7.23

[56] References Cited

U.S. PATENT DOCUMENTS

| | | | |
|---|---|---|---|
| 2,370,780 | 3/1945 | Crom | 242/7.23 X |
| 3,616,070 | 12/1971 | Lemelson | 156/173 X |
| 3,700,512 | 10/1972 | Pearson et al. | 156/173 X |
| 3,822,167 | 7/1974 | Piola | 156/443 |
| 3,905,856 | 9/1975 | Magee et al. | 156/175 X |
| 3,928,674 | 12/1975 | Voermans | 427/233 X |

*Primary Examiner*—David A. Simmons
*Attorney, Agent, or Firm*—Robert W. Beach; Ward Brown

[57] ABSTRACT

Resin is sprayed onto a mandrel by traversing a nozzle axially of the mandrel, reinforcement is applied on the resin layer and continuous filament is wound on the reinforcement and resin. To control the amount of resin sprayed onto particular locations of the mandrel, auxiliary means move the nozzle relative to the mandrel in addition to the axial-traversing movement, such as by moving the nozzle toward and away from the mandrel or by turning the nozzle. Such turning can be about an upright axis to displace the depositing location of the resin spray axially of the mandrel, or about an axis generally parallel to the path along which resin is ejected from the nozzle in a flat fan-shaped spray to change the plane of the spray from a position generally parallel to the axis of the mandrel into a position at a substantial angle to the axis of the mandrel. A shield is swingable either up and down or sidewise between a position offset from the path along which resin is ejected from the nozzle toward the mandrel to a position interposed between the nozzle and the mandrel for intercepting a spray of liquid from the nozzle toward the mandrel.

14 Claims, 12 Drawing Figures

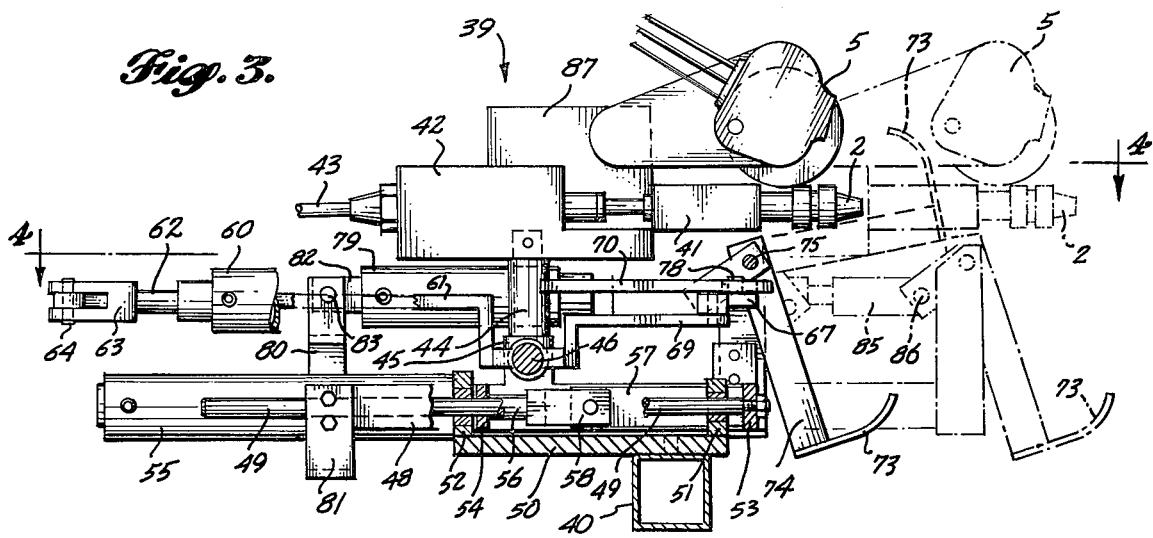
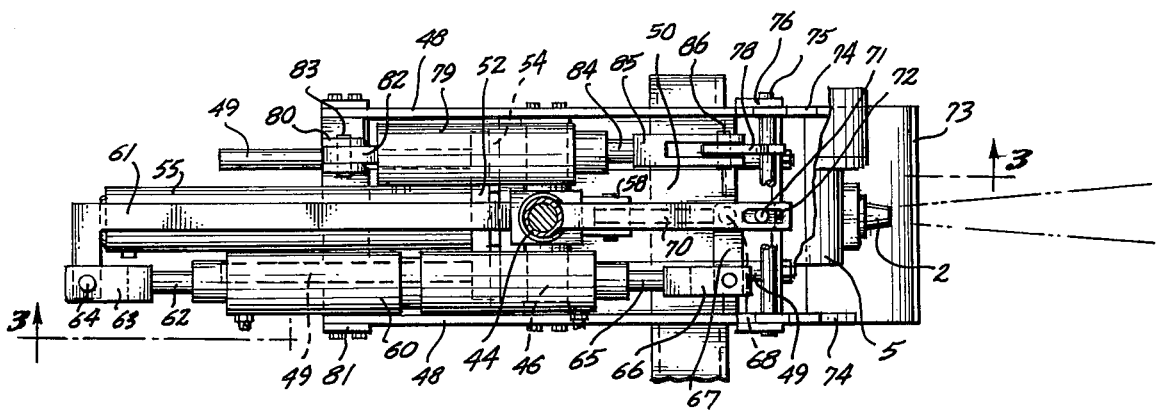
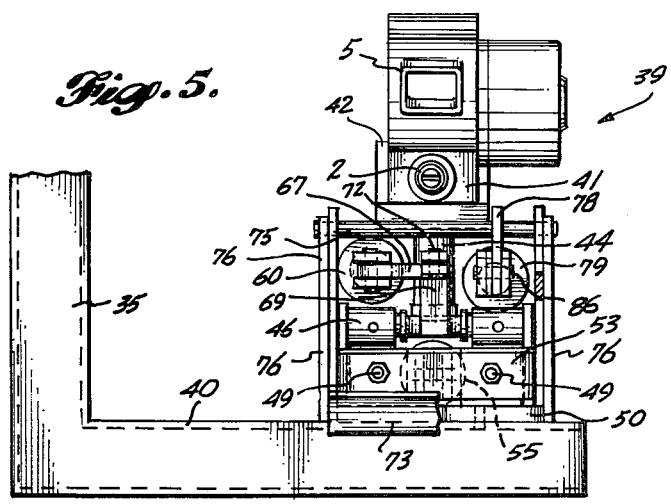

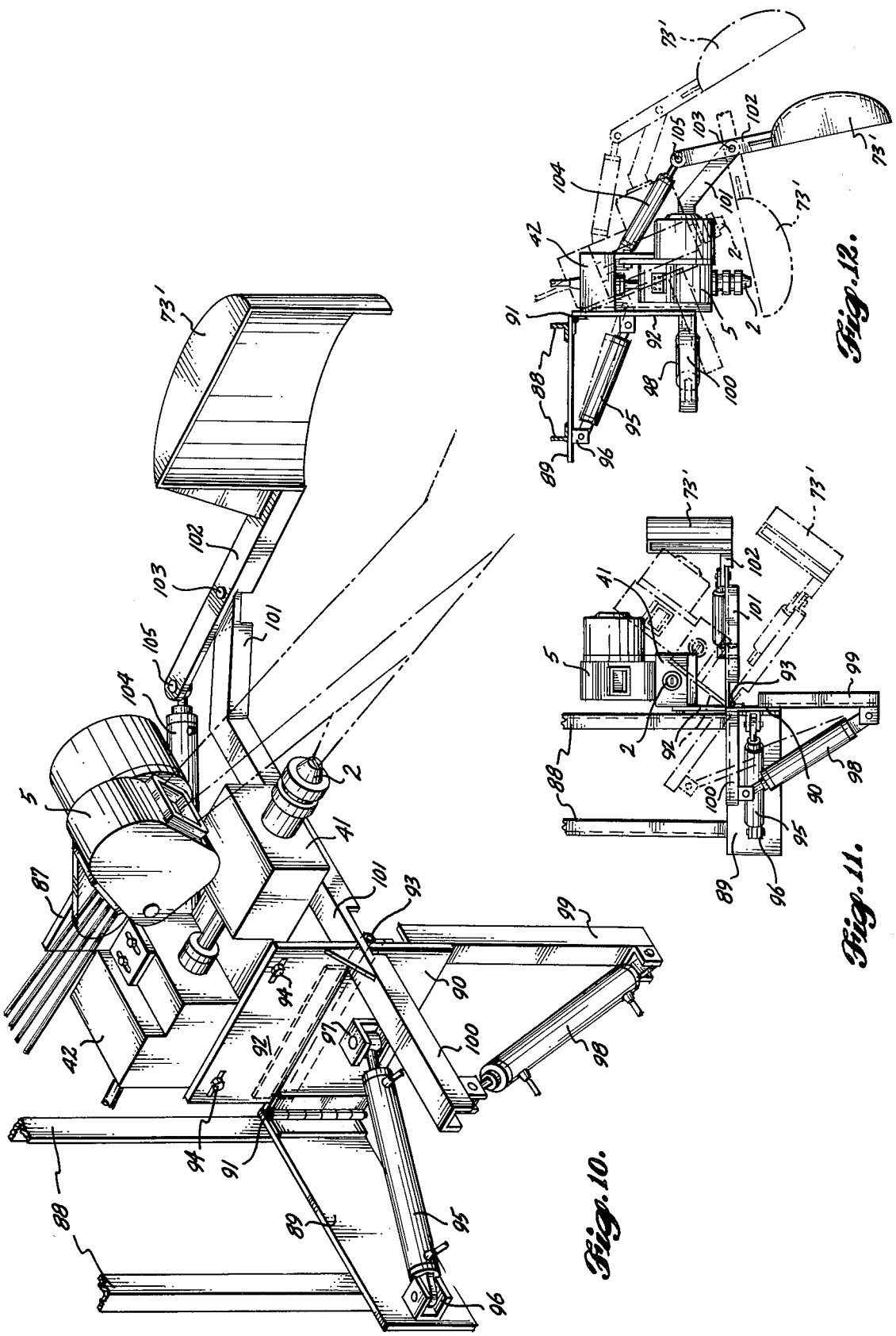

CYLINDER-MAKING APPARATUS AND METHOD

BACKGROUND OF THE INVENTION

1. Field of the Invention

The present invention relates to apparatus for making cylindrical objects by applying resin to the surface of a mandrel and embedding stranded reinforcement in such settable resin.

2. Prior Art

Plastic pipe and other cylindrical plastic articles have been made heretofore by winding continuous filament on mandrels and embedding such filament in settable resin. In producing such articles in the past, it has been difficult to insure uniformity of thickness of the wall structure from end to end of the pipe section or article being formed.

SUMMARY OF THE INVENTION

While maintaining uniform relative axial movement between a resin-applying nozzle and a mandrel on which a hollow cylindrical article is being formed, it is an object to be able to control the application of resin to the mandrel, particularly adjacent to the ends of the article, to produce the desired wall thickness.

A further object is to provide such control of wall thickness while maintaining a high rate of fabrication of the article.

Another object is to provide an apparatus which can be purged of resin at the end of an article-producing operation without dismantling the apparatus and without injuring an article on the mandrel which has been fabricated.

The foregoing objects can be accomplished by providing a resin spray nozzle that can be moved toward or away from a mandrel on which the nozzle sprays resin, or which can be swung relative to the mandrel about an upright axis, or which can dispense the resin in a flat spray the relationship of which to the axis of the mandrel can be altered from being parallel to such axis to being disposed at an angle to such axis. Flushing resin from the nozzle can be accomplished without injury to an article being fabricated on the mandrel by interposing a shield between the nozzle and the mandrel to block the flow of flushing liquid ejected from the nozzle toward the mandrel.

BRIEF DESCRIPTION OF THE DRAWINGS

FIG. 3 is a vertical section through the resin-spraying component of the machine taken on line 3—3 of FIG. 4 with parts broken away.

FIG. 4 is a horizontal section through such component taken on line 4—4 of FIG. 3 and having parts broken away.

FIG. 5 is an end elevation of the resin-spraying component as seen from the right of FIG. 3.

FIG. 10 is a top perspective of a modified form of resin-spraying component; FIG. 11 is an elevation of such component, and FIG. 12 is a plan of such component.

DETAILED DESCRIPTION

Cylindrical articles made by use of the apparatus of the present invention can be of different sizes, but the apparatus is particularly useful for making large pipes or tanks which may be from 4 feet to 14 feet in diameter, for example. The cylindrical article is fabricated by applying a coating of resin to the surface of a mandrel with reinforcement embedded in the resin. Such reinforcement can be glass fiber mat or chopped glass fiber, for example, and the hoop strength of the article is produced by winding endless filament, such as of glass, around the mandrel and embedding it in the resin. The rein preferably is of the type that can be set by a hardener or catalyst, such as polyester resin.

Figure 1:
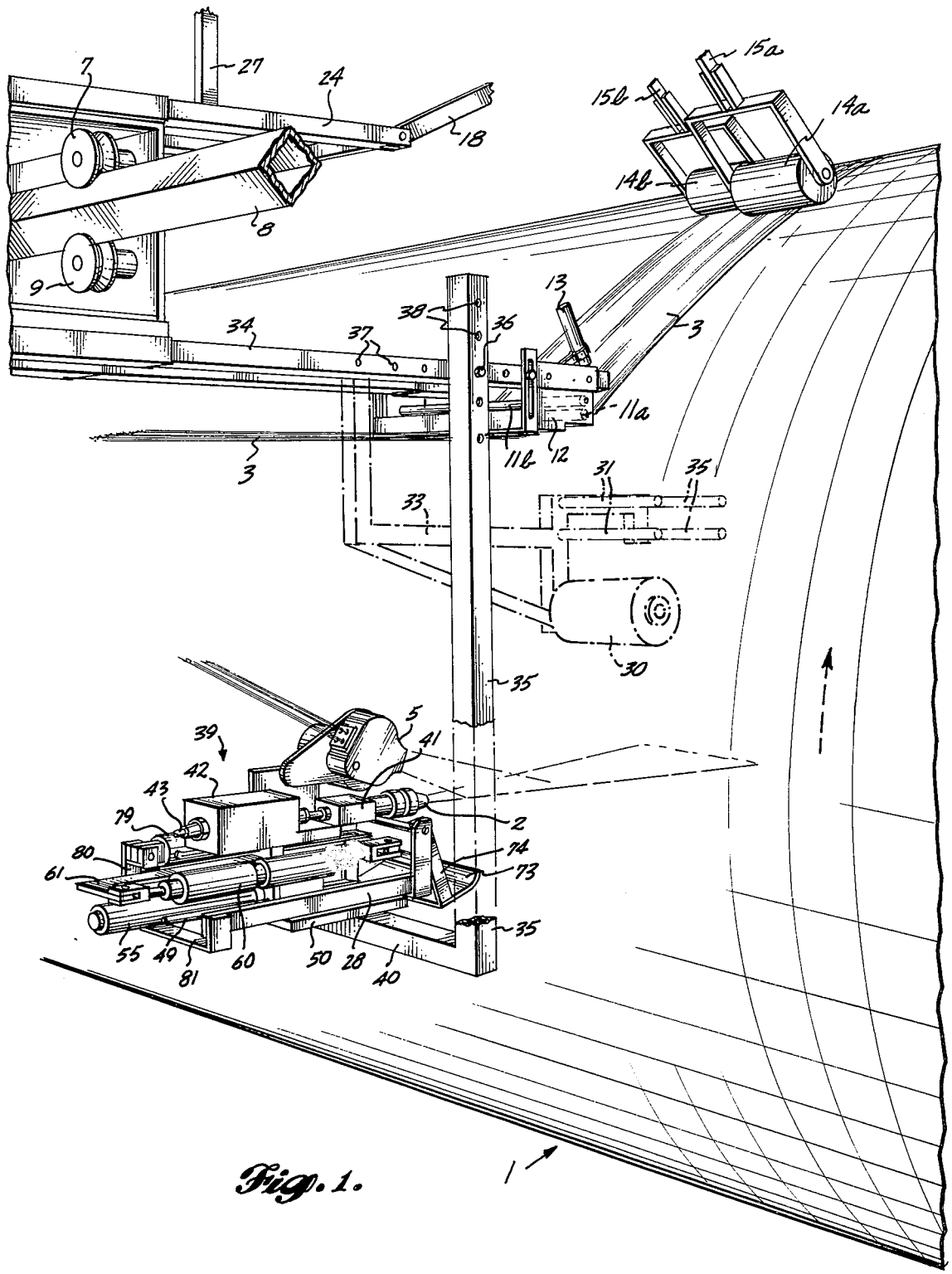
FIG. 1 is a top perspective of a portion of a machine for making cylindrical articles with parts broken away.

FIG. 1 shows the mandrel 1 onto which resin is sprayed from a nozzle 2. As indicated in broken lines in FIG. 1, such nozzle preferably is of the type which ejects a spray of flat fan shape that will usually be disposed in a plane parallel to the axis of the drum. A web 3 formed by a plurality of parallel filaments is fed to the mandrel after viscous resin has been applied to the mandrel surface, and the filaments are pressed against the mandrel to submerge them in the resin so that they will be embedded in the cylindrical wall of the fabricated article when the resin has set.

Figure 2:
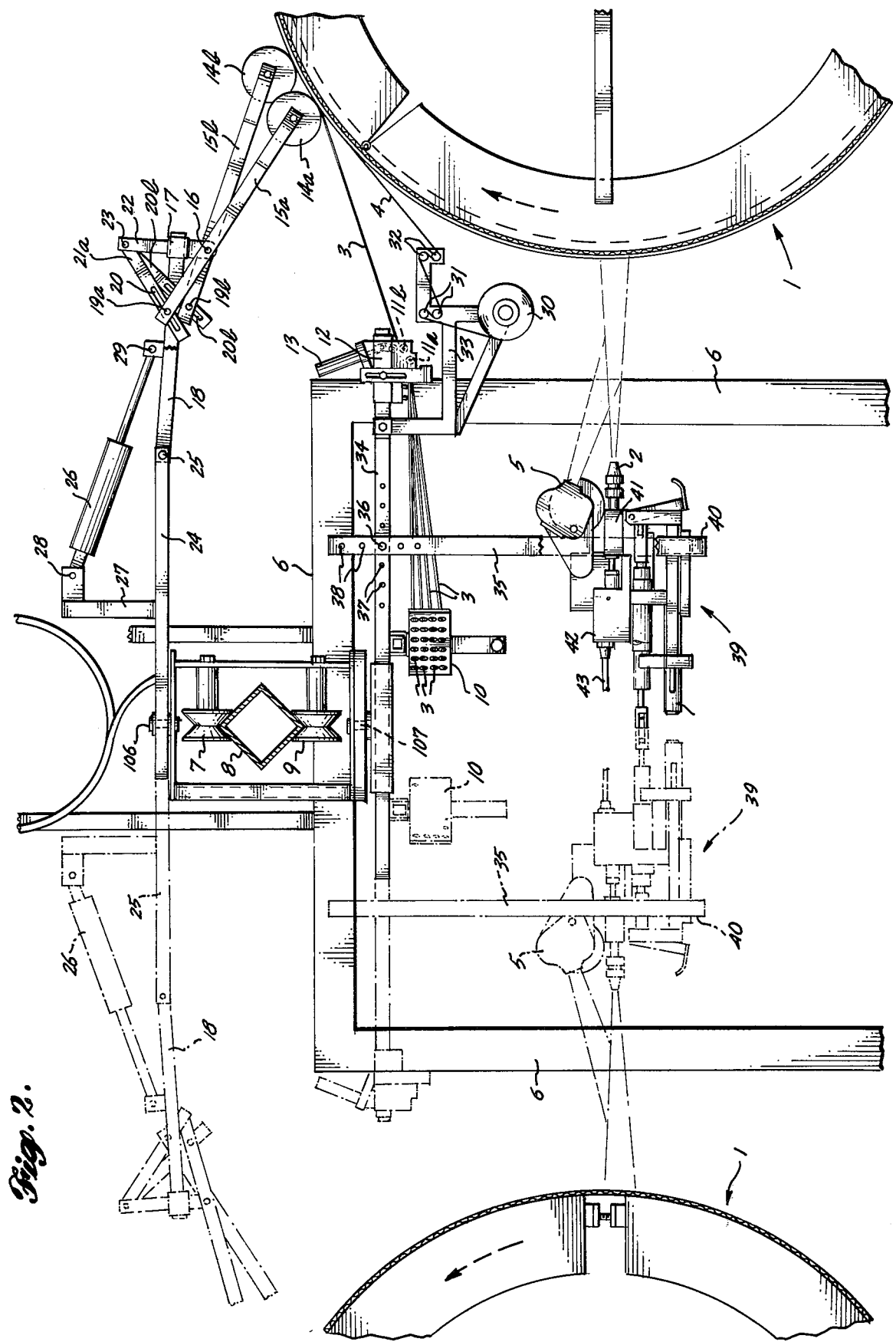
FIG. 2 is a vertical section through a portion of the machine shown in FIG. 1.

If greater strength is desired, a second layer 4 of continuous filament can be applied to the mandrel, as shown in FIG. 2, either throughout the surface of the article being fabricated or in selected bands spaced axially of the mandrel. Additional reinforcement can be supplied by chopped glass fiber ejected from the chopper 5 into the spray of resin ejected from the nozzle 2 to plaster the chopped fiber onto the surface of the mandrel and hold it in place for being submerged into the resin by pressure of the continuous filament web 3, or the filament webs 3 and 4.

The apparatus includes a frame 6 by which the resin-spraying component and the filament-applying components are supported. The entire frame can be translated axially of the mandrel 1 by supporting the frame by a roller 7 rolling along a track 8. Preferably such track is of substantially square cross section, as shown in FIGS. 1 and 2, and the pulley 7 is of the V-groove type. The frame can be stabilized against swinging by providing a steadying roller 9 that is carried by the frame and has an annular V-groove engaging the bottom angle of the track bar 8.

The web of filament 3 can be formed by passing such filaments in substantially parallel relationship through the perforations of filament guide plate 10. Upper and lower filament guide rollers 11a and 11b assist in maintaining the web in planar condition. The opposite ends of such guide rollers are supported by mounting plates 12, and at least one of such guide rollers is pressed against the filament web by a small fluid pressure jack 13.

The web of filaments is pressed into the coating of viscous resin on the mandrel 1 by rollers 14a and 14b journaled in yokes or forks on the ends of roller-mounting arms 15a and 15b, respectively. These arms are supported by a pivot 16 about which they are swingable toward and away from the circumference of the mandrel. Such pivot is supported by a mounting 17 slidable toward and away from the mandrel along a supporting arm 18.

The rollers are held in engagement with the mandrel by setting the arms 15a and 15b at the proper angle relative to the mounting 17. Such angle can be established by pins 19a and 19b extending from portions of the arms 15a and 15b at the side of pivot rod 16 opposite the rollers 14a and 14b through slots 20a and 20b in brace bars 21a and 21b. The upper ends of such brace bars are connected to a post 22 extending upward from mounting 17 by a pivot 23. The pins 19a and 19b can be adjusted along the slots 20a and 20b to dispose the arms 15a and 15b at the desired angle, and then such pins can be secured relative to the slots 20a and 20b, such as by the pins being in the form of bolts.

The roller assembly mounted on arm 18 can be supported by a cantilever bar 24 to which such arm is connected by a pivot 25. The roller-supporting arm 18 can be swung about such pivot by a fluid pressure jack 26 for pressing the rollers 14a and 14b toward the mandrel 1 to immerse the filament web 3 and/or the filament web 4 in the layer of viscous resin on the mandrel. One end of the jack 26 is anchored by a pivot 28 to a post 27 mounted on bar 24. The plunger end of the jack is connected by a pivot 29 to a lug attached to the roller-supporting arm 18 at a location remote from its pivot 25.

By retracting jack 26, the roller-supporting arm 18 can be swung upward to elevate the rollers 14a and 14b above the mandrel 21 so as to enable the web 3 and/or the web 4 to be strung initially and started onto the mandrel. If resin is then sprayed by the nozzle 2 onto the surface of the mandrel and the jack 26 is extended, the rollers 14a and 14b will engage the webs 3 and 4 and immerse them in the viscous resin so that when the resin sets and webs of filament will be embedded in the resin to reinforce the cylindrical article circumferentially.

If a second web or band of filaments 4 is applied to the mandrel, the filaments of such web or band are drawn from the filament spool over and around pairs of guide rods or pins 31 and 32 from which the filament web extends to the mandrel. Such guide rods or pins are mounted on a spool support 33 depending from a horizontal frame bar 34 which also supports the mounting structure for the filament web 3. The resin spray means is also supported from the frame bar by a hanger 35 secured to the bar by a bolt 36.

The hanger bar can be adjusted into various positions located farther from or closer to the mandrel 1 by shifting the hanger in one direction or the other along frame member 34 to locate the bolt 36 for insertion through any selected one of several bolt-receiving holes 37 in such frame member. Also, the spray nozzle assembly can be adjusted elevationally relative to the mandrel 1 by shifting the connecting bolt 36 up or down to a different one of the several holes 38 in the hanger bar 35.

The spray nozzle assembly 39 carried by the hanger 35 is shown in detail in FIGS. 3 to 9, inclusive. Such assembly is mounted on a horizontal bar 40 extending generally parallel to the axis of the mandrel 1. The resin-dispensing assembly includes the mixer 41 resin and catalyst or hardener from which the nozzle 2 projects, the control box 42 and the resin and catalyst or hardener supply tubes 43. The two components 41 and 42 are collectively designated as the resin-dispersing mechanism.

The resin-dispensing mechanism 41, 42 is directly supported on the upper end of a post 44 mounted in an upwardly opening socket 45 for rotation about its axis. Such socket is supported by cross bars 46 extending oppositely from such base, the ends of which bars remote from the post base are secured to blocks 47 carried by the side bars 48 of a reciprocable carriage. Such carriage is mounted for reciprocation on two parallel slide rods 49 located at opposite sides of the post 44 and extending transversely of the bar 40 supporting the resin-dispensing assembly.

Figure 6:
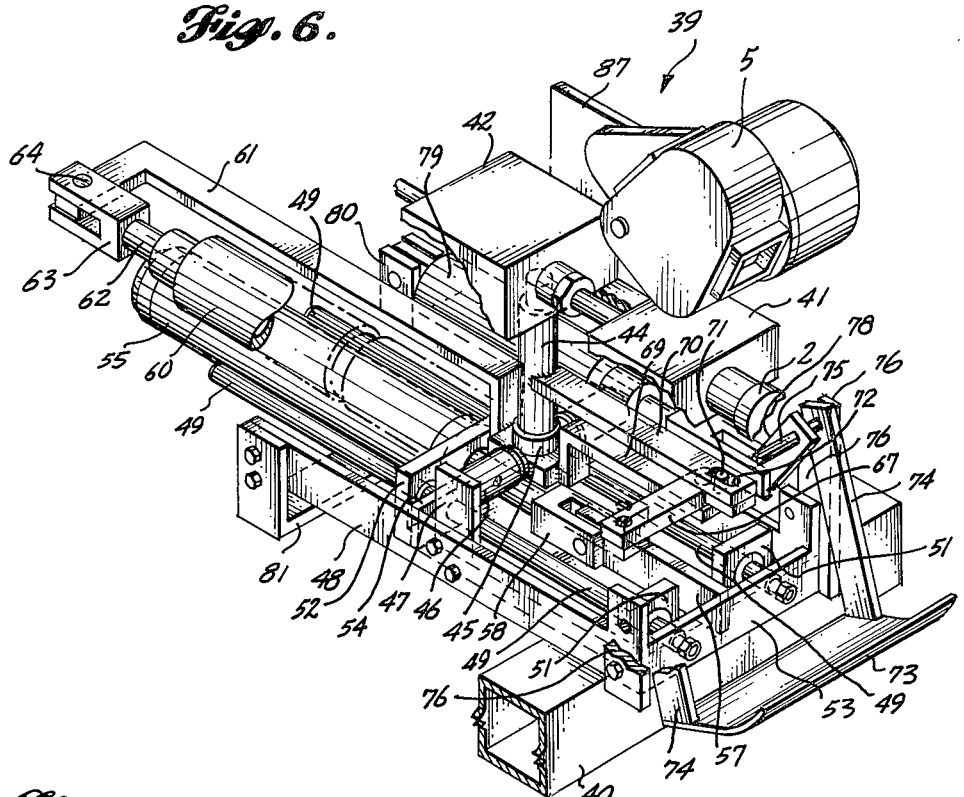
FIG. 6 is a top perspective of the resin-spraying component, parts of which are broken away.
Figure 9:
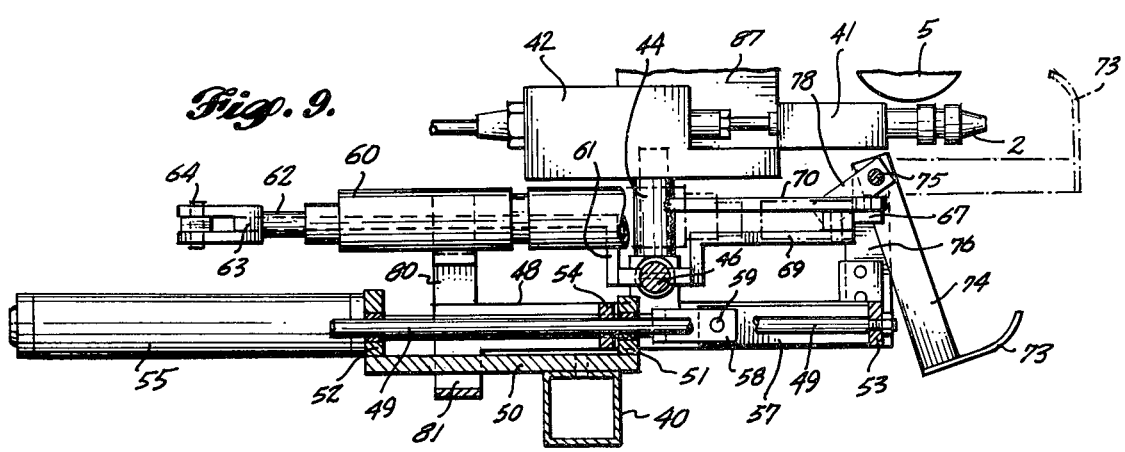
FIG. 9 is a vertical section similar to FIG. 8 showing parts in the broken line position of FIG. 3 and having parts broken away.

A base plate 50 secured to the upper side of the mounting bar 40 carries guides 51 and 52 spaced lengthwise of slide rods 49 through which such slide bars extend, as shown best in FIGS. 3, 6 and 9. Corresponding ends of the slide rods 49 are bolted to an end cross bar 53 of the reciprocating carriage which connects corresponding ends of the side bars 48. A second bar, 54, spaced lengthwise of slide rods 49 from bar 53, is apertured to receive the slide rods therethrough and also connects the opposite side bars 48 of the carriage by having its ends welded to such side bars.

The carriage on which the resin-dispensing mechanism 41, 42 is mounted can be reciprocated lengthwise of slide rods 49 and transversely of the mounting bar 40 by a hydraulic piston-and-cylinder jack 55. Such jack is mounted in cantilever fashion by its end from which the piston rod 56 projects being attached to the guide bar 52 that is mounted on the base plate 50, as shown in FIGS. 3 and 9. The piston rod is connected to a thrust bar 57 by a clevis 58, including a pin 59 providing a hinge connection. The end of thrust bar 57 remote from the clevis is welded to the end cross bar 53 of the carriage.

Not only can the resin-dispensing mechanism be shifted relative to the mounting bar 40 toward and away from the mandrel 1 by reciprocation of the carriage-carrying post 44 effected by the jack 55, but such post can be rotated about an upright axis relative to its base 45 and the carriage to swing the nozzle 2 axially of the mandrel. Such axis is perpendicular to and offset from the axis of the mandrel 1 and also extends transversely of the resin path. Such swinging is effected between the positions shown in FIGS. 7 and 8 by a double cylinder hydraulic jack actuator 60 having its length extending generally parallel to the jack 55.

One end of the actuator 60 is supported from the carriage by a support and reaction bar 61 extending parallel to the direction of carriage movement. One end of this bar is secured to the base 45 for post 44, and the opposite end of such bar is an angle arm that is secured to a piston rod 62 of the actuator 60 by a clevis 63. Such clevis includes the hinge pin 64 enabling the actuator 60 and the bar 61 to swing slightly relative to each other.

The actuator has a second piston rod 65 projecting from its end opposite that from which piston rod 62 projects which is connected by a clevis 66 to one arm of a bell crank 67. The angle of such bell crank is mounted by pivot 68 on a supporting bar 69. Such bar is of the cantilever type, having one end rigidly secured to the base 45 of post 44, as shown best in FIGS. 3 and 6. Such bar is located elevationally above the thrust bar 57 and clevis 58 and projects from the post base in the direction opposite the direction in which bar 61 projects from such base.

Figure 7:
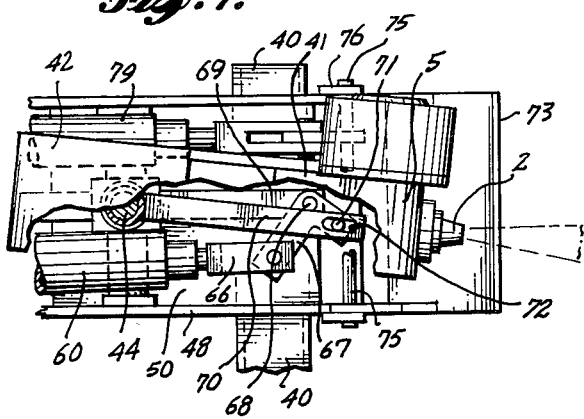
FIGS. 7 and 8 are plans of a portion of the apparatus shown in FIG. 4 having parts broken away and with parts shown in different operative positions.
Figure 8:
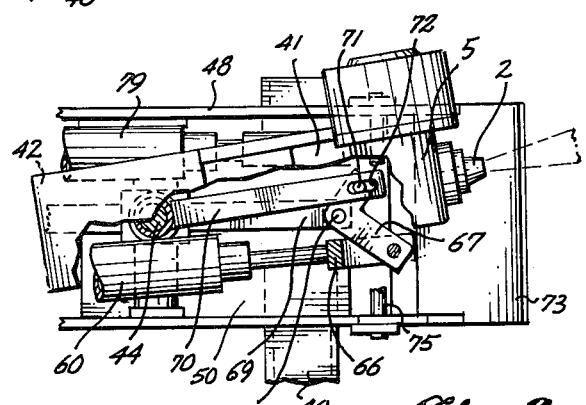

The other arm of the bell crank is connected to the swinging end of a cantilever lever 70 having its root end secured to the post 44, as shown in FIGS. 6, 7 and 8. A crank pin carried by the bell crank extends upward through a slot 72 in post-turning lever 70, which slot extends lengthwise of such lever. When both cylinders of the actuator 60 are contracted, as shown in FIG. 7, the bell crank will effect swinging of the lever 70 and nozzle 2 in one direction, and, when both cylinders of the actuator are extended, the bell crank will be swung in the opposite direction to swing lever 70 and nozzle 2 oppositely, as shown in FIG. 8. When one cylinder of the actuator is extended and the other cylinder is contracted the nozzle 2 will be centered in the position shown in FIG. 4.

In operation, resin is ejected from nozzle 2 onto the mandrel 1. As the nozzle assembly is traversed axially of the mandrel and the mandrel is rotated, it may be desired, particularly at the opposite ends of axial travel of the nozzle assembly, to produce an adequate buildup of resin without interrupting the reciprocation of the nozzle assembly along the track 8. As shown in FIG. 1, the resin is ejected from the nozzle 2 in a spray of fan shape. Consequently, if the nozzle is moved closer to the mandrel the deposition of the resin on the mandrel will be more concentrated, whereas, if the nozzle is moved farther from the mandrel the resin will be distributed more widely. Such movement of the nozzle can be effected by actuation of the jack 55. Alternatively, or in addition, a greater concentration of resin can be effected if the nozzle is swung about the upright axis of post 44 in the direction opposite the direction of movement of the nozzle assembly along track 8. Conversely, the concentration of resin can be decreased if the nozzle is swung about the upright axis of post 44 in the same direction as the nozzle assembly is being moved along track 8.

Polyester resin, which usually is the type of resin used for making plastic cylindrical objects by use of the present apparatus and method, sets rather quickly when it has been mixed with catalyst or hardener. Consequently, when the operation of making a cylindrical article is interrupted, it is desirable to flush all of the resin mixture out of the nozzle 2 immediately so as to prevent resin from setting in the nozzle. For this purpose, the flow of resin through the nozzle can be interrupted and solvent can be supplied to the nozzle instead to clean all of the resin out of the nozzle. Any solvent ejected from the nozzle 2 onto resin previously applied to the mandrel 1 would be likely to deteriorate such article.

To intercept scavenging solvent ejected from nozzle 2, a shield 73 is provided which can be moved from a retracted position into an operative position in which it is interposed between the nozzle 2 and the mandrel 1 for blocking ejection of liquid from the nozzle onto the mandrel. Such shield is shown in FIG. 3, 4, 6 and 9 in the form of a curved plate carried by spaced parallel supporting arms 74. Such arms are swingably supported by a pivot rod 75, the opposite ends of which are carried by posts 76. The shield-supporting arms 74 are secured to the pivot rod 75 so that the shield can be swung from the inoperative position, shown in full lines in FIG. 9, into the spray-blocking position, shown in broken lines in that figure, in which the shield is interposed between the nozzle 2 and the mandrel 1 by rotating the pivot rod 75.

To effect rotation of pivot rod 75 for swinging the shield 73 between inoperative position and operative position, a lever arm 78 is secured to the pivot rod. Such lever arm can be swung by operation of a hydraulic jack 79 extending generally parallel to the jack 55 and the actuator 60. The end of jack 79 remote from pivot rod 75 is supported on the carriage by a post 80 mounted on a cross bar 81 connecting corresponding ends of the carriage side bars 48. A lug 82 projecting from the end of jack 79 is connected to the upper portion of post 80 by a pivot pin 83 so that the jack can swing elevationally relative to the post.

A piston rod 84 projecting from the hydraulic jack 79 is connected by clevis 85 to lever arm 78. The clevis pin 86 enables the jack to swing the lever arm with minor swing of the jack up and down about its pivot 83. The shield-supporting rod 75 and the jack-supporting post 80 support the actuating mechanism for the shield 73 from the reciprocable carriage so that the shield-mounting rod 75 will always be in the same relationship to the nozzle 2 irrespective of the position of reciprocation of the carriage and nozzle relative to the mandrel. Consequently, the shield can be moved between inoperative position and operative position in all positions of travel of the carriage. The degree to which the nozzle 2 can be swung about the upright axis of post 44 is sufficiently small, as shown in FIGS. 7 and 8, so that the shield can be moved effectively from inoperative position into operative position blocking the spray of liquid from nozzle 2 in all laterally swung positions of the nozzle.

In order to enable chopped fiber reinforcement to be used in conjunction with the resin, chopped fiber-dispensing mechanism 5 is provided as a component part of the resin-applying assembly. It is desirable for such chopped fiber-dispensing mechanism to be mounted in constant relationship to the nozzle 2 despite movement of the nozzle toward or away from the mandrel 1 or swinging of the nozzle about the upright axis of post 44. To accomplish this result, the chopped fiber-dispensing mechanism 5 is mounted on a plate 87, as shown in FIGS. 3 and 6, which plate can be mounted as an attachment to the resin-dispensing mechanism control box 42.

FIGS. 10, 11 and 12 show a modified type of assembly for supporting and controlling the attitude of the nozzle 2. In this mechanism, the supporting framework 88 is substituted for the hanger 35 shown in FIGS. 1 and 2. The resin-spraying apparatus is supported from a supporting plate 89 attached to the frame members 88. The supporting structure includes a swingable plate 90 attached by a hinge 91 to one end of the plate 89. A tiltable upper plate 92 is mounted adjacent to the upper edge of the swinging plate 90 by a hinge 93 having a horizontal pivot axis. The resin-dispensing mechanism 41, 42 is secured to the upper portion of such tiltable plate by bolts 94 extending through slots in such plate.

In the apparatus of FIGS. 10, 11 and 12, no power mechanism is provided for moving the nozzle 2 toward or away from the mandrel 1, but the resin-dispensing mechanism can be shifted toward or away from the mandrel manually by sliding the bolts 94 along the slots in plate 92. The nozzle can be turned about an upright axis to swing the spray ejected from nozzle 2 axially of the mandrel independently of movement of the supporting apparatus for the resin-dispensing mechanism along track 8. Such axis is perpendicular to and offset from the axis of the mandrel 1 and also extends transversely of the resin path. Such turning is accomplished by actuation of hydraulic jack 95 to swing plates 90 and 92 about the upright axis of hinge 91. In this instance, however, the axis of swing is offset from the center of the resin spray ejected from the nozzle 2 instead of such turning being about an axis in the same vertical plane as the center of the resin spray, as the axis of post 44 is located in the apparatus of FIGS. 3 to 9, inclusive.

One end of jack 95 is supported by anchoring it by clevis 96 to a location on plate 89 spaced generally horizontally a considerable distance from the axis of swing formed by hinge 91. The other end of the jack is secured by clevis 97 to a portion of plate 90 spaced a substantial distance approximately horizontally from the upright axis of hinge 91. By lengthening and shortening jack 95, the nozzle 2 can be swung between the solid line position and the broken line position shown in FIG. 12.

As shown in FIG. 1 and FIG. 10, the resin is ejected from nozzle 2 in a flat fan-shaped spray which is normally substantially parallel to the axis of mandrel 1. By tilting plate 92 about the axis of hinge 93, the resin-dispensing mechanism can be tilted correspondingly to turn the nozzle 2 about an axis parallel to the direction in which the spray is ejected from the nozzle and perpendicular to the axis of the mandrel 1 so that the plane of the resin spray is disposed at an angle to the axis of the mandrel. When the plane of the spray is parallel to the axis of the mandrel, the swath of the spray on the surface of the mandrel is of maximum axial extent. If the nozzle 2 were rotated about its axis through 90° so that the plane of the spray was perpendicular to the axis of the mandrel, the swath of the resin spray would be of minimum axial extent. The width of the resin spray swath can, therefore, be altered as may be desired by tilting the resin-dispensing apparatus about the axis of hinge 93.

Tilting of the resin-dispensing mechanism about the axis of hinge 93 can be effected and controlled by varying the effective length of jack 98 extending between an upright reaction arm 99 attached to upright plate 90 and a horizontal arm 100 attached to plate 22 and extending perpendicular to it. The opposite ends of the jack 98 can be connected to the arms 99 and 100, respectively, by clevises. By extending the effective length of the jack, the resin-dispensing mechanism can be tilted about the axis of hinge 93 into the broken line position shown in FIG. 11.

In the apparatus shown in FIGS. 10, 11 and 12, a spray shield 73' is provided which can be moved from the inoperative position, shown in solid lines in FIGS. 10 and 12, and the broken line position at the left of the solid line position in FIG. 12 in which the shield is interposed between the nozzle 2 and the mandrel for blocking ejection of liquid from the nozzle onto the mandrel. The shield is carried by an arm 101 at a location offset laterally from the nozzle. The shield is mounted on the swinging end of a lever 102, which is attached to arm 101 by a pivot 103. The end of lever 102 at the side of such pivot opposite shield 73' is attached to a shield-actuating jack 104 by a pivot 105.

When the jack 104 is extended, it will swing the lever 102 about pivot 103 to move shield 73' into the broken line position shown in FIG. 12 at the left of the solid line position of the shield. As also shown in that figure, because the shield-supporting arm 101 is carried by swingable plage 90, the shield will be moved conjointly with the resin-dispensing mechanism as such plate is swung about the upright axis of hinge 91. Consequently, the shield can be swung into operative position relative to the nozzle 2 effectively in all swung positions of plate 90.

Also, since the shield-carrying arm 101 is rigidly connected to tiltable plate 92, the shield will be displaced conjointly with the resin-dispensing mechanism as the tiltable plate 92 is swung relative to the plate 90 between the solid line position and the broken line position shown in FIG. 11. In whatever tilted position plate 92 may be, therefore, the shield 73' can be swung by extending jack 104 into a position for intercepting the spray ejected from nozzle 2.

In manufacturing a cylindrical article from sprayed resin, particularly if the article is of large size, it is necessary to build up the desired wall thickness by applying to the periphery of the mandrel several successive coats of resin. It may be desirable to allow the resin to set to some extent between successive coats, or at least it will be desirable to allow the resin to harden before the completed formed article is removed from the mandrel. In order to utilize the apparatus of the present invention more economically, therefore, the arrangement shown in FIG. 2 will enable the apparatus to be swung bodily about pivots 106 and 107 from the solid line position shown at the right of FIG. 2 to the broken line position shown at the left of that figure. In such broken line position, resin, chopped reinforcing fiber and continuous filament can be applied to the surface of a second mandrel 1' at the side of the track 8 opposite mandrel 1 in the manner described above with respect to the application of such material to the circumference of mandrel 1. Since the operation of the apparatus will be the same in applying the resin and reinforcement to mandrel 1' as described in connection with the mandrel 1, it is not ncessary to repeat such description.

For small pipe sufficient strength may be provided simply by utilizing a combination of resin dispensed from the nozzle 2 and chopped fiber dispensed from the fiber-supplying device 5. The web of continuous filament 3 will be required in addition to afford adequate circumferential strength.

The material 4 can be of various types. Initially a film sheet of polyester resin can be laid onto the surface of the mandrel to service as a parting sheet. The material 4 can then be various types of reinforcement such as a web of fibrous material, glass mat, woven roving or glass cloth. In each instance, such reinforcement is laid down into the resin layer, and the continuous strands 3, which are dry initially, are pressed against the reinforcement and rolled down into the resin by the rollers 14a and 14b.

I claim:

1. In cylinder-making apparatus including a rotatable mandrel, resin spray means for applying settable resin on the surface of the mandrel, reinforcement supply means for supplying stranded reinforcement to be applied to the surface of the mandrel and traversing means for effecting relative movement of the resin spray means and the reinforcement supply means, on one hand, and the mandrel, on the other hand, in a direction axially of the mandrel, the improvement comprising shield means disposable in a position interposed between the resin spray means and the mandrel for blocking spray of liquid from the resin spray means onto the mandrel.

2. In the apparatus defined in claim 1, the resin spray means including a nozzle projecting a substantially flat fan-shaped spray of resin in a plane generally parallel to the axis of the mandrel and means supporting said nozzle for turning about an axis generally parallel to the path along which resin spray is ejected from the resin spray means for tilting the plane of the resin spray between a position generally parallel to the axis of the mandrel and a position at an angle to the axis of the mandrel.

3. In the apparatus defined in claim 1, supporting means guiding the shield means for movement into and out of the position interposed between the resin spray means and the mandrel.

4. In the apparatus defined in claim 3, the shield-guiding means supporting the shield for swinging about a substantially horizontal axis from a position lower than the path along which resin is ejected from the resin spray means onto the mandrel upward into a position interposed between the resin spray means and the mandrel.

5. In cylinder-making apparatus including a rotatable mandrel, resin spray means for applying settable resin on the surface of the mandrel, reinforcement supply means for supplying stranded reinforcement to be applied to the surface of the mandrel, traversing means for effecting relative movement of the resin spray means and the reinforcement supply means, on one hand, and the mandrel, on the other hand, in a direction axially of the mandrel and means for supplying liquid to the resin spray means for scavenging resin from the resin spray means, the improvement comprising shield means, and supporting means supporting said shield means for movement into and out of a position interposed between the resin spray means and the mandrel for blocking ejection of liquid from the resin spray means onto the mandrel.

6. In the apparatus defined in claim 5, the supporting means including means supporting the shield for swinging about a generally horizontal axis from a position offset elevationally from the resin spray means into a position interposed between the resin spray means and the mandrel.

7. In the apparatus defined in claim 5, the supporting means including means guiding the shield for swinging about an upright axis between a position offset from the path along which liquid is ejected from the resin spray means onto the mandrel and a position interposed between the resin spray means and the mandrel.

8. In cylinder-making apparatus including a rotatable mandrel, resin spray means for applying settable resin on the surface of the mandrel, reinforcement supply means for supplying stranded reinforcement to be applied to the surface of the mandrel and traversing means for effecting relative movement of the resin spray means and the reinforcement supply means, on one hand, and the mandrel on the other hand, in a direction axially of the mandrel, the improvement comprising the resin spray means including a nozzle projecting a substantially flat fan-shaped spray of resin in a plane generally parallel to the axis of the mandrel, means supporting said nozzle for turning about an axis generally parallel to the path along which resin spray is ejected from the resin spray means for tilting the plane of the resin spray between a position generally parallel to the axis of the mandrel and a position at an angle to the axis of the mandrel, and auxiliary means for effecting such turning of said nozzle independently of the traversing means for controlling the amount of resin applied to the mandrel by said nozzle at particular locations on the mandrel.

9. In the apparatus defined in claim 8, the auxiliary means including turning means for turning the resin spray means relative to the supporting means about an axis substantially perpendicular to the mandrel axis for displacing the resin-depositing location lengthwise of the mandrel on which a spray of resin is ejected from the resin spray means.

10. In the apparatus defined in claim 1, means for supplying to the resin spray means liquid for scavenging resin from the resin spray means, shield means disposable in a position interposed between the resin spray means and the mandrel for blocking spray of liquid from the resin spray means onto the mandrel, and means supporting said shield means from the supporting means for the resin spray means for swinging therewith and guiding said shield means for movement between a position offset from the path along which liquid is ejected from the resin spray means onto the mandrel and a position interposed between the resin spray means and the mandrel.

11. The method of applying settable resin onto the surface of a mandrel which comprises rotating the mandrel about its axis, traversing resin spray means axially along the mandrel while ejecting a spray of resin therefrom onto the mandrel, and turning the resin spray means while it is being traversed axially of the mandrel about an axis extending generally parallel to the path along which resin is ejected from the resin spray means towards the mandrel to control the amount of resin applied to the mandrel by the resin spray means at a particular locations on the mandrel.

12. The method defined in claim 11, including the steps of laying woven reinforcement sheet material on the resin applied to the mandrel, and pressing such woven sheet material into the resin by direct pressure applied thereto after it has been laid on the resin.

13. The method defined in claim 12, including laying woven roving on the resin.

14. The method defined in claim 12, including laying glass cloth on the resin.

* * * * *

UNITED STATES PATENT OFFICE
CERTIFICATE OF CORRECTION

Patent No. 4,071,389      Dated January 31, 1978

Inventor(s) Frank Elmer Ives

It is certified that error appears in the above-identified patent and that said Letters Patent are hereby corrected as shown below:

Column 9, lines 7 and 8, cancel "guiding" and insert --supporting--; line 8, cancel "supporting" and insert --guiding--.

Column 10, line 18, cancel "1" and insert --8--; line 41, cancel "a" following "at"; line 49, after "resin", insert --applied to the mandrel--; line 51, after "resin", insert --applied to the mandrel--.

Signed and Sealed this

Eighth Day of August 1978

[SEAL]

Attest:

RUTH C. MASON
*Attesting Officer*

DONALD W. BANNER
*Commissioner of Patents and Trademarks*